United States Patent
Cha et al.

(10) Patent No.: US 12,323,716 B2
(45) Date of Patent: Jun. 3, 2025

(54) APPARATUS AND METHOD FOR IMPROVING IMAGE QUALITY IN A DUAL CONVERSION GAIN IMAGE SENSOR

(71) Applicant: SK hynix Inc., Gyeonggi-do (KR)

(72) Inventors: Su Ram Cha, Gyeonggi-do (KR); A Ram Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 118 days.

(21) Appl. No.: 18/299,724

(22) Filed: Apr. 13, 2023

(65) Prior Publication Data
US 2024/0171873 A1    May 23, 2024

(30) Foreign Application Priority Data
Nov. 22, 2022   (KR) .......... 10-2022-0156966

(51) Int. Cl.
| | | |
|---|---|---|
| *H04N 25/585* | (2023.01) | |
| *H04N 23/72* | (2023.01) | |
| *H04N 23/741* | (2023.01) | |
| *H04N 23/76* | (2023.01) | |
| *H04N 25/42* | (2023.01) | |

(52) U.S. Cl.
CPC .......... *H04N 25/585* (2023.01); *H04N 23/72* (2023.01); *H04N 23/741* (2023.01); *H04N 23/76* (2023.01); *H04N 25/42* (2023.01)

(58) Field of Classification Search
CPC .... H04N 25/585; H04N 23/72; H04N 23/741; H04N 23/76; H04N 25/42; H04N 25/77; H04N 25/57; H04N 25/671
See application file for complete search history.

(56) References Cited

U.S. PATENT DOCUMENTS

| | | | |
|---|---|---|---|
| 10,664,960 B1 | 5/2020 | Lee | |
| 2010/0183241 A1* | 7/2010 | Lin ........................... | G06T 5/73 |
| | | | 382/270 |
| 2019/0020832 A1 | 1/2019 | Takane | |
| 2023/0300471 A1* | 9/2023 | Ju ........................... | H04N 25/78 |
| | | | 348/239 |

* cited by examiner

*Primary Examiner* — Mekonnen D Dagnew
(74) *Attorney, Agent, or Firm* — IP & T GROUP LLP

(57) ABSTRACT

An image sensor includes a pixel array in which a plurality of pixels are arranged in a matrix form, each pixel outputting a first pixel datum and a second pixel datum according to a dual conversion gain. The image sensor includes a signal convertor configured to generate first kernel data including first pixel data and second kernel data including second pixel data, which are output from a pixel group including a target pixel and multiple pixels surrounding the target pixel; determine a partial region brightness based on the second pixel data included in the second kernel data; and perform fusion of the first kernel data and the second kernel data based on the partial region brightness.

19 Claims, 8 Drawing Sheets

ововALL

APPARATUS AND METHOD FOR IMPROVING IMAGE QUALITY IN A DUAL CONVERSION GAIN IMAGE SENSOR

CROSS-REFERENCE TO RELATED APPLICATIONS

This patent application claims the benefit of Korean Patent Application No. 10-2022-0156966, filed on Nov. 22, 2022, the entire disclosure of which is incorporated herein by reference.

TECHNICAL FIELD

One or more embodiments of the present disclosure described herein relate to an image processing technique, and more particularly, to an apparatus and a method for improving image quality in a dual conversion gain image sensor.

BACKGROUND

An image sensor captures an image by using a property of a semiconductor that responds to light. The image sensor can be divided into two types: a charge coupled device (CCD) and a complementary metal oxide semiconductor (CMOS). The image sensor using the CMOS has been widely used due to an advantage that analog and digital control circuits can be directly implemented on a single integrated circuit (IC). Performance of the image sensor is determined based on a quality of image data output from the image sensor.

BRIEF DESCRIPTION OF THE DRAWINGS

The description herein makes reference to the accompanying drawings wherein like reference numerals refer to like parts throughout the figures.

DETAILED DESCRIPTION

Figure 1:
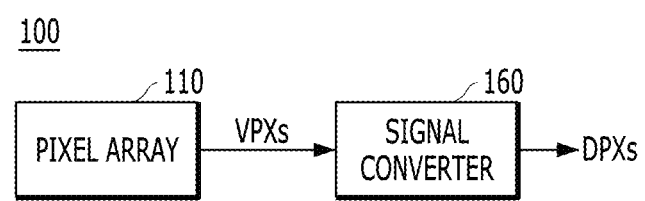
FIG. 1 illustrates an image sensor according to an embodiment of the present disclosure.

Various embodiments of the present disclosure are described below with reference to the accompanying drawings. Elements and features of this disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components e.g., an interface unit, circuitry, etc.

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational e.g., is not turned on nor activated. The block/unit/circuit/component used with the "configured to" language includes hardware for example, circuits, memory storing program instructions executable to implement the operation, etc. Additionally, "configured to" can include a generic structure e.g., generic circuitry, that is manipulated by software and/or firmware e.g., an FPGA or a general-purpose processor executing software to operate in a manner that is capable of performing the task(s) at issue. "Configured to" may also include adapting a manufacturing process e.g., a semiconductor fabrication facility, to fabricate devices e.g., integrated circuits that are adapted to implement or perform one or more tasks.

As used in this disclosure, the term 'circuitry' or 'logic' refers to all of the following: (a) hardware-only circuit implementations such as implementations in only analog and/or digital circuitry and (b) combinations of circuits and software and/or firmware, such as (as applicable): (i) to a combination of processor(s) or (ii) to portions of processor (s)/software including digital signal processor(s), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'circuitry' or 'logic' applies to all uses of this term in this application, including in any claims. As a further example, as used in this application, the term "circuitry" or "logic" also covers an implementation of merely a processor or multiple processors or portion of a processor and its (or their) accompanying software and/or firmware. The term "circuitry" or "logic" also covers, for example, and if applicable to a particular claim element, an integrated circuit for a storage device.

As used herein, the terms "first," "second," "third," and so on are used as labels for nouns that they precede, and do not imply any type of ordering e.g., spatial, temporal, logical, etc. The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Embodiments of the present invention may provide an apparatus and an operating method capable of controlling pixel data fusion based on brightness of a partial region in an image output from an image sensor capable of outputting pixel data to which dual conversion gain (DCG) is applied. Herein, the pixel data fusion is a process used in image sensor technology to enhance the quality and resolution of an image. It can involve combining the output of multiple pixel data having different dynamic ranges in order to create a more accurate and detailed representation of the captured image.

In addition, embodiments of the present invention may provide an image obtaining device and operation method for compensating for differences between pixel data according to a change, which occurred in a manufacturing process, inside an image sensor capable of outputting pixel data with the dual conversion gain (DCG).

In an embodiment, an image sensor can include a pixel array including a plurality of pixels arranged in a matrix form, each pixel outputting a first pixel datum and a second pixel datum according to a dual conversion gain (DGC); and a signal converter configured to: generate first kernel data including first pixel data and second kernel data including second pixel data, wherein the first and second pixel data are output from a pixel group including a target pixel and multiple pixels surrounding the target pixel; determine brightness of a partial region based on the second pixel data included in the second kernel data; and perform fusion of the first kernel data and the second kernel data based on the brightness of the partial region.

The signal converter can include a gain controller configured to determine a gain according to the brightness of the partial region, apply the gain to a first pixel datum and a second pixel datum output from the target pixel, and perform the fusion of the first kernel data and the second kernel data; and an analog-to-digital converter configured to convert an analog datum output from the gain controller into a digital datum.

The first kernel data and the second kernel data can have a same size of the pixel group having a 3×3, 5×5, or 7×7 matrix form.

In the image sensor, a conversion gain for determining a first pixel datum output from the target pixel is less than that for determining a second pixel datum output from the target pixel.

In another image sensor, a conversion gain for determining a second pixel datum output from the target pixel is less than that for determining a first pixel datum output from the target pixel.

The signal converter can be configured to: compare a second pixel datum of the target pixel included in the second kernel data with predetermined criteria regarding brightness of the multiple pixels to obtain comparison results; and classify the comparison results according to at least one of color filters of the multiple pixels and distances between the multiple pixels and the target pixel to determine the brightness of the partial region.

The signal converter can be configured to determine a first gain based on the brightness of the partial region.

The signal converter can be configured to determine a second gain based on standard deviation determined based on the first kernel data and the second kernel data.

The signal converter can be configured to: divide the second kernel data by the first kernel data to determine a partial region ratio; calculate the standard deviation of the partial region ratio; and determine the second gain based on the standard deviation.

The signal converter can be configured to: apply different gains to the first kernel data and the second kernel data; and perform the fusion of the first kernel data and the second kernel data to which the different gains are applied.

The pixel can include a transfer transistor that transfers charges generated by a photo-converting element to a floating node; a reset transistor that resets the floating node in response to a reset signal; a capacitor, selectively connected to the floating node, to change capacitance of the floating node; an amplification transistor that outputs a voltage corresponding to a potential change of the floating node; and a selection transistor that outputs the voltage transmitted from the amplification transistor as one of the first pixel datum and the second pixel datum.

In an embodiment, a method for operating an image sensor can include outputting a first pixel datum and a second pixel datum according to a dual conversion gain (DCG) from each pixel in a pixel group; generating first kernel data including first pixel data and second kernel data including second pixel data, wherein the first and second pixel data are output from the pixel group including a target pixel and multiple pixels surrounding the target pixel; determining a first gain based on brightness of a partial region determined based on the first kernel data and the second kernel data; determining a second gain based on a deviation of the partial region determined based on the first kernel data and the second kernel data; and performing fusion of the first pixel datum and the second pixel datum to which the first gain and the second gain are applied.

The method can further include converting a fusion pixel datum generated by the fusion of the first pixel datum and the second pixel datum into a digital pixel datum.

The first kernel data and the second kernel data can have a same size of the pixel group having a 3×3, 5×5, or 7×7 matrix form.

The determining the first gain can include comparing a second pixel datum of the target pixel included in the second kernel data with predetermined criteria regarding brightness of the multiple pixels to obtain comparison results; classifying the comparison results according to at least one of color filters of the multiple pixels and distances between the multiple pixels and the target pixel to determine the brightness of the partial region; and determining a first gain based on the brightness of the partial region.

The determining the second gain can include dividing the second kernel data by the first kernel data to determine a partial region ratio; calculating a standard deviation of the partial region ratio; and determining the second gain based on the standard deviation.

A conversion gain for determining the first pixel datum output from the target pixel can be less than that for determining the second pixel datum output from the target pixel.

A conversion gain for determining the second pixel datum output from the target pixel can be less than that for determining the first pixel datum output from the target pixel.

In another embodiment, a camera device is capable of outputting a first pixel datum and a second pixel datum according to a dual conversion gain (DCG) from each pixel in a pixel group, in response to an operation mode change or an ISO sensitivity setting. The camera device can be configured to: generate first kernel data including first pixel data and second kernel data including second pixel data, which are output from the pixel group including a target pixel and multiple pixels surrounding the target pixel; determine a first gain based on brightness of a partial region determined based on the first kernel data and the second kernel data; determine a second gain based on a deviation of the partial region determined based on the first kernel data and the second kernel data; and perform fusion of the first pixel datum and the second pixel datum to which the first gain and the second gain are applied.

The camera device can be configured to convert a fusion pixel datum generated by the fusion of the first pixel datum and the second pixel datum into a digital pixel datum.

In another embodiment, an image sensing device can include: a pixel array including a plurality of pixels capable of generating first and second pixel data for a target pixel among the plurality of pixels, based on a dual conversion gain, the first pixel data having a low dynamic range and the second pixel data having a high dynamic range; and a signal converter configured to: scale one pixel data selected from the first and the second pixel data based on a difference between the first and the second pixel data to generate scaled pixel data; and merge the scaled one pixel data and unselected pixel data to output merged pixel data, wherein merging the scaled one pixel data and the unselected pixel data is determined based on brightness of a kernel between the target pixel and multiple pixels surrounding the target pixel.

Embodiments will now be described with reference to the accompanying drawings, wherein like numbers reference like elements.

FIG. 1 illustrates an image sensor 100 according to an embodiment of the present disclosure.

Referring to FIG. 1, the image sensor 100 can include a pixel array 110 and a signal converter 160. The image sensor 100 can be a CMOS image sensor which is widely applicable to a device in various fields such as mobile phones, surveillance security, autonomous driving, machine vision, and the Internet of Things. When the image sensor 100 outputs image data, a system including the image sensor 100 can modify or process the image data output from the image sensor 100 according to various purposes and use modified or processed image data for the various purposes.

Figure 6:
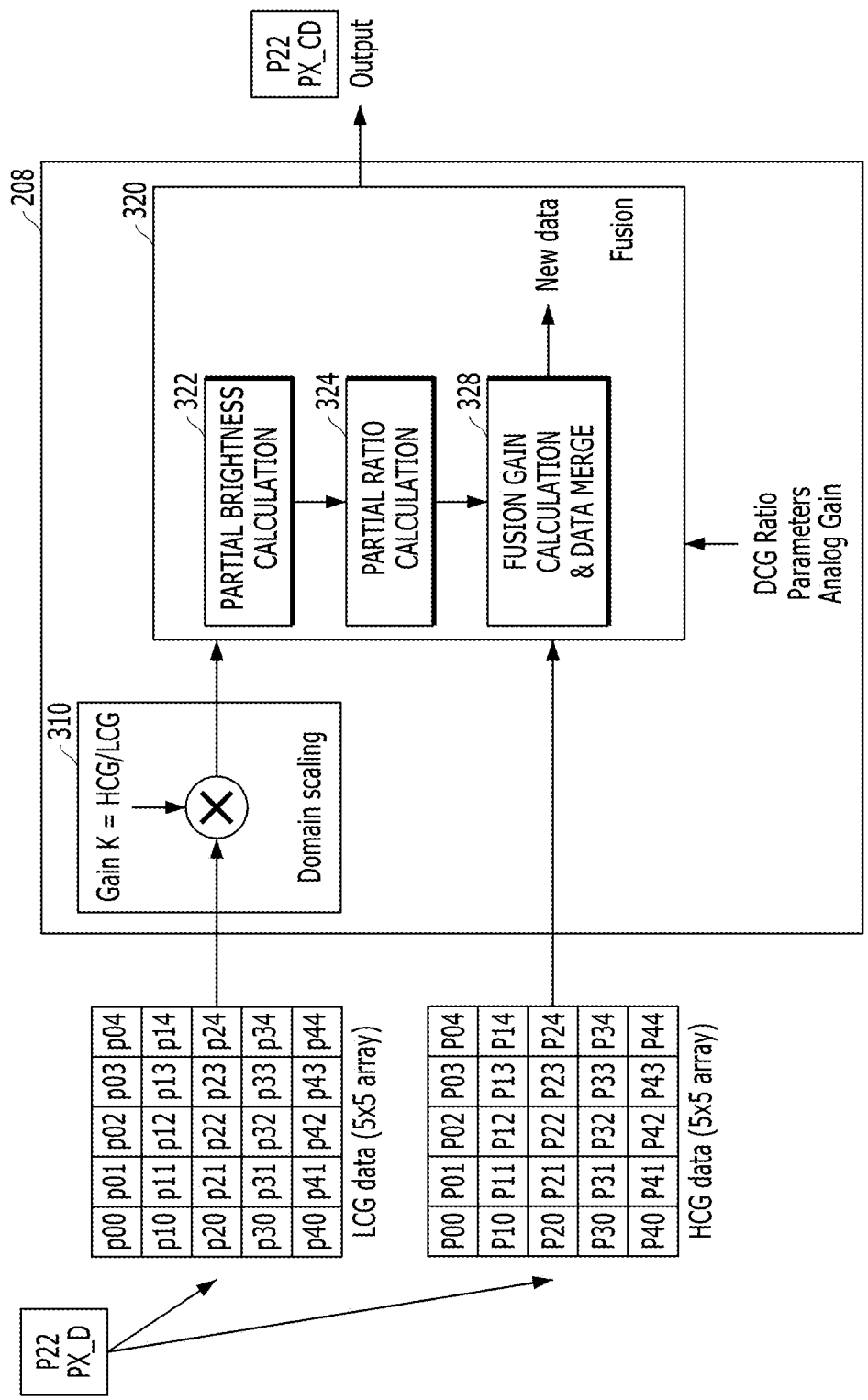
FIG. 6 is a diagram illustrating a method for performing gain control according to an embodiment of the present disclosure.

The pixel array 110 can include a plurality of pixels arranged in a row direction and a column direction (refer to FIG. 6). The pixel array 110 can generate a plurality of pixel signals VPXs for each row. For example, the pixel array 110 can generate a plurality of pixel signals VPXs from plural pixels arranged in a first row during a first row time, and generate a plurality of pixel signals VPXs from plural pixels arranged in an nth row during an nth row time, where 'n' is an integer greater than 2. Each of the plurality of pixel signals VPXs may be an analog signal corresponding to incident light.

The signal converter 160 can convert the plurality of analog-type pixel signals VPXs into a plurality of digital-type pixel values DPXs. According to an embodiment, the plurality of digital-type pixel values DPXs can be output corresponding to a Bayer pattern described later. For example, the signal converter 160 can include a column analog-to-digital conversion circuit 140 described with reference to FIG. 2.

The better a quality of the image data output from the image sensor 100, the wider a range in which the image sensor 100 may be used. There are various methods for improving the quality of image data. For example, the smaller and more densely arranged pixels included in the pixel array 110 in the image sensor 100, the better image data may be obtained. In addition, the larger a dynamic range of pixels included in the pixel array 100, the better image data may be obtained.

In some embodiments, the dynamic range (DR) may refer to a brightness ratio of the brightest portion to the darkest portion in the image data. For example, the image sensor 100 may output the image data expressed as integer values between 0 and 255 of each channel R, G, B in an 8-bit representation method per a channel. This 8-bit representation method may belong to a Low Dynamic Range (LDR) or a Standard Dynamic Range (SDR). On the other hand, the image data can be expressed as integer values in a high dynamic range (HDR). A HDR method can use more bits than 8 bits per a channel. For example, the HDR method can use 10 or 12 bits per a channel to represent an image. Because the HDR method uses more bits than the 8-bit representation, the image data generated through the HDR method can express more different and various colors.

For example, when the dynamic range of pixels included in the image sensor 100 is narrow, a high dynamic range (HDR) method can be implemented by acquiring multiple LDR data with different exposure times and combining the multiple LDR data with each other. In an embodiment, an exposure in a camera device may refer to how much light to give to a surface of photosensitive material in the image sensor 100 through an aperture and a shutter. The exposure can be affected by the aperture that regulates an amount of light passing through a lens, the shutter speed at which the shutter opens and closes once, and an ISO sensitivity which is an index of how sensitive a film is to light. The ISO sensitivity may be a standard set by the International Organization for Standardization (ISO) that represents sensitivity to light as a numerical value. The camera device may generate an HDR image by combining a plurality of LDR images, after adjusting an exposure degree to obtaining the plurality of LDR images.

The image sensors could be divided into two types. One image sensor can include a low capacitance photo sensor having a low capacitance floating diffusion region. Through the combination of the low capacitance photo sensor and the low capacitance floating diffusion region, the image sensor can obtain an image with a high conversion gain and a great low-light sensitivity. However, this image sensor may have a poor dynamic range and a low full well capacity. Another-type image sensor can have a high overall well capacity and a high dynamic range (HDR) by fusing a high charge capacity photosensor and a high charge capacity floating diffusion region. However, this image sensor may have a low conversion gain and a poor low-light sensitivity.

To improve image quality, the image sensor 100 described in FIG. 1 may output pixel data to which a dual conversion gain (DCG) is applied. The pixel in the image sensor 100 may include a floating diffusion region (or a floating node) to which the dual conversion gain (DCG) may be applied. When the image sensor 100 can include pixels that can apply the dual conversion gain (DCG) to output the pixel data, the image sensor 100 can have a high conversion gain and a great sensitivity to achieve great low-light performance, and a high overall well capacity and a conversion gain to achieve a high dynamic range. A detailed structure of the pixel included in the image sensor 100 will be described later with reference to FIG. 3.

Figure 2:
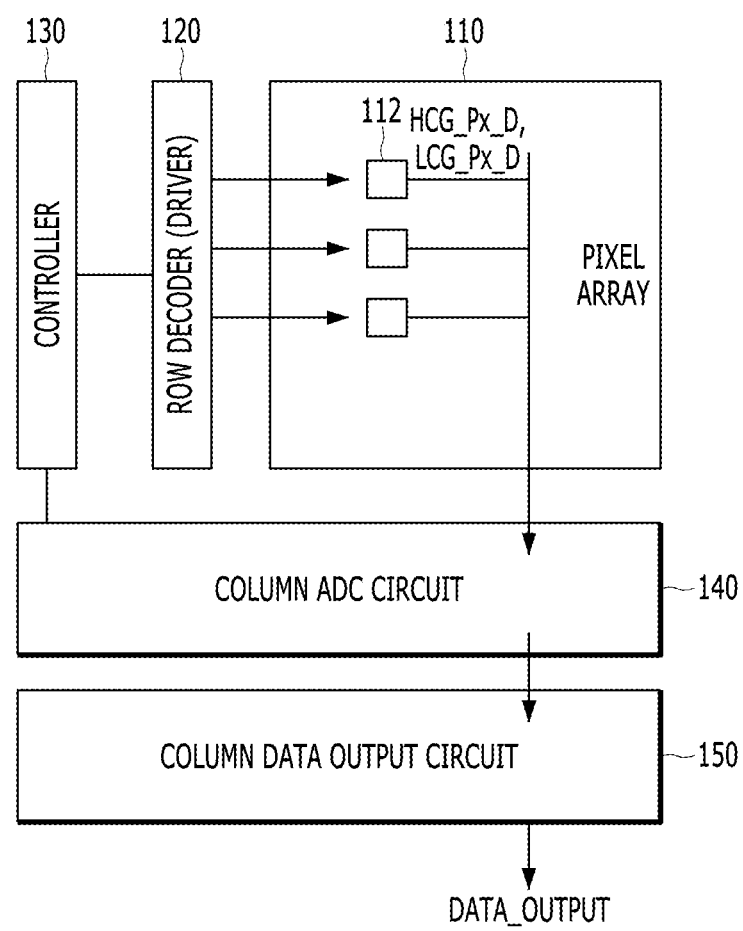
FIG. 2 illustrates a configuration of an image sensor according to an embodiment of the present disclosure.

FIG. 2 illustrates a configuration of an image sensor according to an embodiment of the present disclosure, e.g., the image sensor 100 described in FIG. 1.

Referring to FIG. 2, the image sensor 100 can include a pixel array 110, a row decoder 120, a controller 130, a column analog-to-digital conversion (ADC) circuit 140, and a column data output circuit 150. According to an embodiment, the image sensor 100 can further include an additional module or circuit configured to process data to generate an image.

The pixel array 110 can include a plurality of pixels 112. In the pixel array 110, the plurality of pixels 112 are arranged in horizontal and vertical directions of a plane. In an embodiment, each of the plurality of the pixels 112 can include one photodiode and four transistors. In another embodiment, each of the plurality of the pixels 112 can include one photodiode and three transistors. In still another embodiment, each of the plurality of the pixels can include a plurality of photodiodes.

The row decoder (or row driver) 120 can drive the plurality of pixels 112 included in the pixel array 110 in a row unit. When the row decoder 120 drives the plurality of pixels 112 in a row unit, plural pixels 112 can transmit signals, e.g., pixel data, to the column analog-to-digital conversion circuit 140 through wirings disposed in each column COLUMN. The row decoder 120 can be controlled by the controller 130.

The controller 130 can control overall operations performed in the image sensor 100. The controller 130 can control the row decoder 120, the column analog-to-digital conversion circuit 140, and the column data output circuit 150.

Signals or information output by the pixels 112 driven by the row decoder 120 are a type of analog signal. The column analog-to-digital conversion circuit 140 can convert the signals or information output from the pixels 112 into digital signals or information. The digital signals or information converted by the column analog-to-digital conversion circuit 140 can be temporarily stored in the column data output circuit 150. The output data DATA_OUTPUT can be transferred, by the controller 130, to another device, e.g., a circuit, a module, and the like for an image processing.

The column analog-to-digital conversion circuit 140 included in the image sensor 100 can have a signal reading structure, e.g., a column-parallel structure, in which units or modules operating in a column unit are arranged in parallel. The column analog-to-digital conversion circuit 140 having this structure can effectively reduce a noise and increase a bandwidth in a process of reading data output from the pixel array 110. Through this, the column analog-to-digital conversion circuit 140 can read data output from the pixel array 110 to support outputting the read data at a very high speed while reducing signal quality degradation.

As a resolution of the image sensor 100 increases, a size (e.g., a plane or a pitch) of the pixel 112 included in the pixel array 110 decreases. As the image sensor 100 supports a higher frame rate, the time it takes for the pixel 112 included in the pixel array 110 to receive and convert incident light into electric charges could become shorter. In addition, as the image sensor 100 is mounted on a small device such as a portable terminal and a camera, there is a limitation in the size of the image sensor 100. For these reasons, the column analog-to-digital conversion circuit 140 could be disposed in each column with a narrow interval. An amplitude of a signal or information output from the pixel array 110 might be reduced. The column analog-to-digital conversion circuit 140 could be designed to be operable under very strict constraints.

Figure 3:
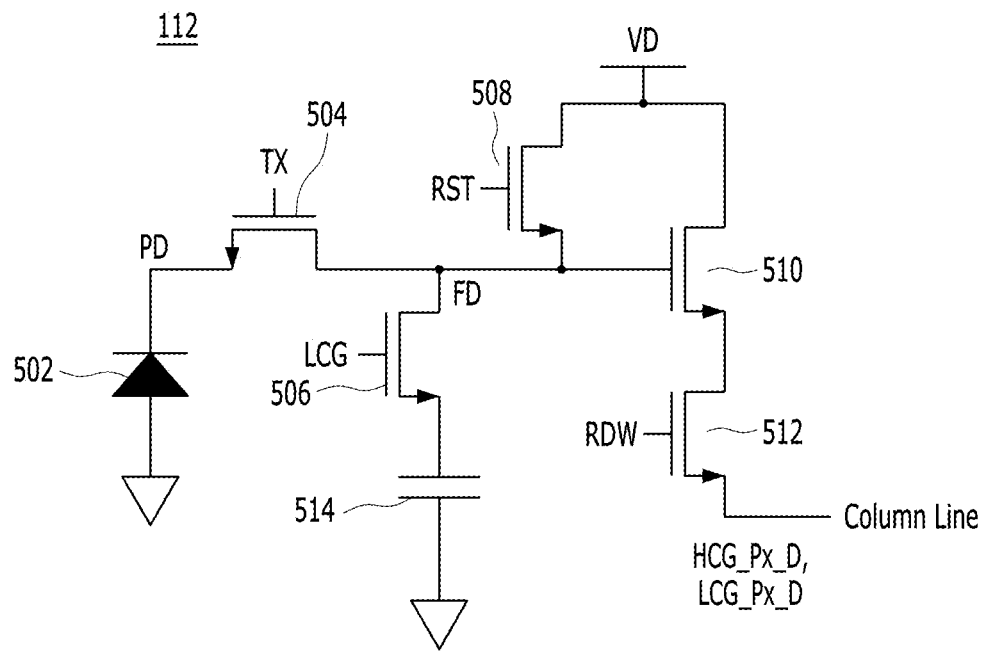
FIG. 3 illustrates a pixel structure according to an embodiment of the present disclosure.
Figure 4:
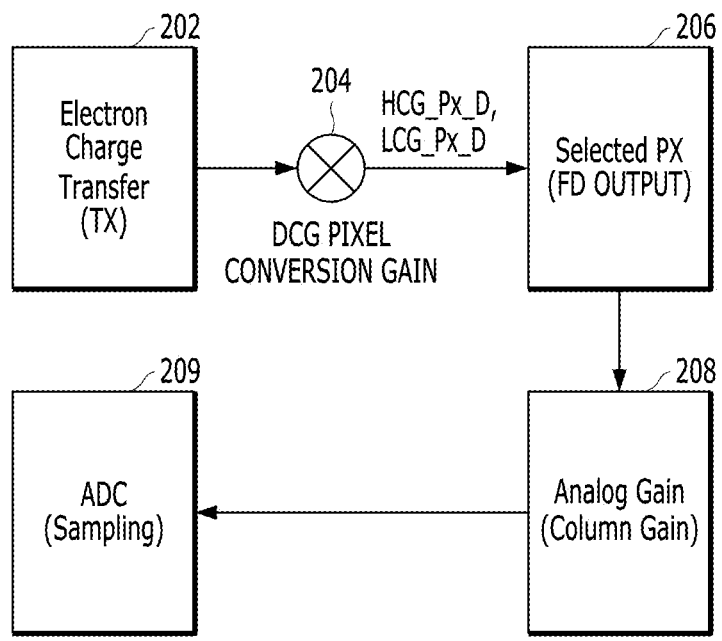
FIG. 4 illustrates an operation and a configuration of an image sensor according to an embodiment of the present disclosure.

FIG. 3 illustrates a pixel structure according to an embodiment of the present disclosure. FIG. 4 illustrates an operation and a configuration of the image sensor according to an embodiment of the present disclosure, e.g., the image sensor described in FIG. 1.

Referring to FIGS. 3 and 4, the image sensor 100 may transfer electric charges generated by a photodiode (PD) 502 in response to incident light (202). In the illustrated embodiment of FIG. 3, the electric charges generated by the photodiode 502 may be transferred to the floating diffusion region FD through the transfer transistor 504. The floating diffusion region FD can be reset by a reset transistor RST 508. Further, a potential change of the floating diffusion region FD can be changed into a voltage by an amplification transistor 510.

The image sensor 100 may generate different pixel data LCG_Px_D, HCG_Px_D according to the dual conversion gain (DCG) (204). The capacitance of the floating diffusion region FD in the pixel may be changed according to a low conversion gain signal LCG transmitted to each pixel included in the pixel array 110. Accordingly, a dynamic range DR of the pixel may be changed due to the change of the capacitance of the floating diffusion region FD. A plurality of pixel data LCG_Px_D, HCG_Px_D may include a first dynamic range pixel datum LCG_Px_D and second dynamic range pixel datum HCG_Px_D output from the pixel 112.

The image sensor 100 may select the pixel 112 and transmit pixel data generated in the pixel 112 through a column line (206). Referring back to FIG. 3, the row selection transistor 512 may output one of the plurality of pixel data LCG_Px_D, HCG_Px_D generated by the pixel 112 in response to a row selection signal RDW. According to an embodiment, the pixel 112 in the image sensor 100 may output the first dynamic range pixel datum LCG_Px_D and then output the second dynamic range pixel datum HCG_Px_D. In another embodiment, the pixel 112 in the image sensor 100 may output the second dynamic range pixel datum HCG_Px_D and then output the first dynamic range pixel datum LCG_Px_D.

The image sensor 100 may apply different gains to the plurality of pixel data LCG_Px_D, HCG_Px_D output from the pixel 112 and then fuse the plurality of pixel data LCG_Px_D, HCG_Px_D to which the different gains are applied (208). The image sensor 100 may perform scaling to map an input domain to an output range to fuse the plurality of pixel data LCG_Px_D, HCG_Px_D. In an embodiment, the plurality of pixel data LCG_Px_D, HCG_Px_D output from the pixel 112 may be generated based on different criteria. When a ratio of the dual conversion gain (DCG) can be applied (e.g., multiplied) to one of the plurality of pixel data LCG_Px_D, HCG_Px_D (e.g., domain scaling shown in FIG. 6), the one of the plurality of pixel data LCG_Px_D, HCG_Px_D could be changed so that the plurality of pixel data LCG_Px_D, HCG_Px_D might be generated based on a same criterion.

The image sensor 100 according to an embodiment of the present invention may use pixel data output from multiple pixels surrounding a target pixel, for calculating a gain applied to the target pixel. According to an embodiment, brightness of the target pixel and the multiple pixels can be compared with each other to determine brightness of a partial region rather than an entire region in an entire image. The plurality of pixel data LCG_Px_D, HCG_Px_D can be fused based on brightness of the partial region. For example, a gain applied to the plurality of pixel data LCG_Px_D, HCG_Px_D output from the target pixel may be determined based on the brightness of the partial region. An operation method for fusing the plurality of pixel data LCG_Px_D, HCG_Px_D will be described with reference to FIGS. 5 to 9. A dynamic range DR of fused pixel datum in which the plurality of pixel data LCG_Px_D, HCG_Px_D are fused may increase more widely than that of the first dynamic range pixel datum LCG_Px_D or the second dynamic range pixel datum HCG_Px_D.

The image sensor 100 may convert the fused pixel datum into a digital pixel datum after the plurality of pixel data LCG_Px_D, HCG_Px_D output from the pixel 112 are fused (209). As the dynamic range of the fused pixel datum increases, the fused pixel datum could be converted into more bits of digital pixel datum. Accordingly, the quality of image data output from the image sensor 100 may be improved.

Figure 5:
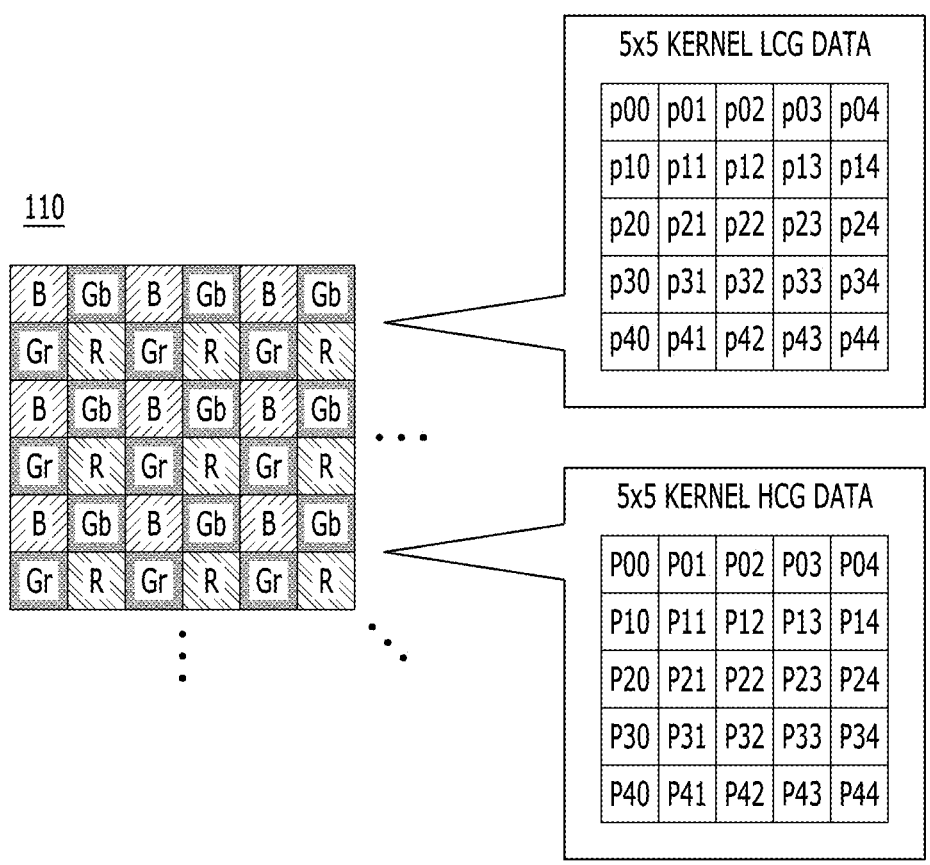
FIG. 5 illustrates kernel data output from a pixel array according to an embodiment of the present disclosure.

FIG. 5 illustrates kernel data according to an embodiment of the present disclosure, e.g., kernel data output from a pixel array described in FIG. 2.

Referring to FIG. 5, plural pixels of the pixel array 110 can be arranged in a predetermined pattern. For example, the plural pixels of the pixel array 110 can be arranged in the Bayer pattern. The Bayer pattern consists of repeated cell groups, each cell group having 2×2 pixels. In each cell group, two pixels (Gb, Gr) having a green color filter can be arranged to face each other diagonally, and one pixel (B) having a blue color filter and one pixel (R) having a red color filter can be disposed in the remaining corners. The four pixels B, Gb, Gr, R might not be limited to the arrangement shown in FIG. 3. According to an embodiment, the four pixels B, Gb, Gr, R can be arranged in various ways on the premise of the Bayer pattern described above. The Bayer pattern is described as an example for an embodiment of the present disclosure. The embodiment of the present disclosure is not limited thereto, and various patterns such as a quad pattern could be applicable.

According to an embodiment, the image sensor 100 may classify pixel data output from the pixel array 110 into 5×5 kernel data. Each pixel 112 included in the pixel array 110 may output a plurality of pixel data LCG_Px_D, HCG_Px_D having different dynamic ranges (DR), and the image sensor 100 may generate a plurality of kernel pixel data 5×5 KERNEL LCG DATA, 5×5 KERNEL HCG DATA. For example, first kernel data (5×5 KERNEL LCG DATA) and second kernel data (5×5 KERNEL HCG DATA) may be generated to include first dynamic range pixel datum LCG_Px_D and the second dynamic range pixel datum HCG_Px_D, respectively, which are output from a target pixel (Third Row, position 22, i.e., p22) and multiple pixels ($1^{st}$ to $5^{th}$ Rows, $1^{st}$ to $5^{th}$ Columns) arranged around the target pixel (Third Row, position 22, i.e., p22).

Hereinafter, when the pixel array 110 outputs a plurality of pixel data LCG_Px_D, HCG_Px_D having different dynamic ranges (DR), the image sensor 100 will specifically describe a method for fusing the plurality of pixel data LCG_Px_D, HCG_Px_D. In order to fuse the plurality of pixel data LCG_Px_D, HCG_Px_D, the image sensor 100 may include a calculator, a filter, a processor, circuitry, or the like which is used for temporarily storing the pixel data LCG_Px_D, HCG_Px_D before fusion of the pixel data LCG_Px_D, HCG_Px_D, or calculating a gain applied to the pixel data LCG_Px_D, HCG_Px_D through multiplication, division, integration, or differentiation.

FIG. 6 is a diagram illustrating a method for performing gain control according to an embodiment of the present disclosure. Specifically, FIG. 6 describes a procedure of generating fused pixel datum P22 PX_CD by fusing a plurality of pixel data P22 PX_D output from a target pixel at a specific location (Third Row, Third Column, position 22) in the pixel array 110.

Referring to FIGS. 4 and 6, the image sensor 100 may apply gain to a plurality of pixel data LCG_Px_D, HCG_Px_D output from the target pixel (Third Row, Third Column, position 22, i.e., p22) and then fuse the plurality of pixel data LCG_Px_D, HCG_Px_D (208). To determine the gain, the image sensor 100 can use first kernel data (5×5 KERNEL LCG DATA) and second kernel data (5×5 KERNEL HCG DATA). The first kernel data (5×5 KERNEL LCG DATA) can include first dynamic range pixel data LCG_Px_D which are output from a pixel group including the target pixel (Third Row, position 22, i.e., p22) and multiple pixels (1st to 5th Rows, 1st to 5th Columns) surrounding the target pixel (Third Row, position 22, i.e., p22). The second kernel data (5×5 KERNEL HCG DATA) can include second dynamic range pixel data HCG_Px_D which are output from the same pixel group including the target pixel (Third Row, position 22, i.e., p22) and the multiple pixels (1st to 5th Rows, 1st to 5th Columns) surrounding the target pixel (Third Row, position 22, i.e., p22).

The image sensor 100 may perform scaling for mapping the input domain to the output range by multiplying the first kernel data (5×5 KERNEL LCG DATA) by a first gain (Gain K). For example, the first gain K may be a dual conversion gain (DCG) ratio (i.e., a ratio K=HCG/LCG). In an embodiment, the scaling may refer to pixel data transformation activities that aim to improve the informational content of pixel data by adjusting an existing pixel data set so that it conforms with a set of requirements (e.g., a same criterion, a same domain, a same reference).

After scaling the first kernel data (5×5 KERNEL LCG DATA) to make the first kernel data (5×5 KERNEL LCG DATA) and the second kernel data 5×5 KERNEL HCG DATA on a same input domain, the image sensor 100 may calculate brightness of a partial region (322). The brightness of the partial region might not be obtained from the entire region of the image, but may be calculated based on the pixel group including the target pixel and multiple pixels located within a predetermined interval from the target pixel. Referring to FIGS. 5 and 6, the multiple pixels belonging to a 5×5 matrix around the target pixel are used. However, according to an embodiment, other multiple pixels belonging to a matrix range such as 3×3 or 7×7 may be used. As the number of peripheral pixels used to calculate the brightness of the partial region increases, separation distances of the multiple pixels from the target pixel may vary. The image sensor 100 may calculate a gain applied to the target pixel differently according to the separation distances between the target pixel and the multiple pixels. The method for calculating the brightness of the partial region (322) will be described later with reference to FIG. 7.

After calculating the brightness of the partial region, the image sensor 100 can determine a ratio corresponding to the partial region and a gain according to a deviation (324). For example, the image sensor 100 may calculate a ratio of a partial region by dividing the second kernel data (5×5 KERNEL HCG DATA) including the second dynamic range pixel data HCG_Px_D by the first kernel data (5×5 KERNEL LCG DATA) including the first dynamic range pixel data LCG_Px_D. The image sensor 100 may calculate a standard deviation from the ratio of the partial region and determine a gain corresponding to the standard deviation. A method of determining the ratio of the partial region or the gain corresponding to the standard deviation will be described later with reference to FIG. 8.

The image sensor 100 may determine a gain corresponding to brightness of a partial region and fuse a plurality of pixel data LCG_Px_D, HCG_Px_D output from the target pixel after reflecting the determined gain (328). The image sensor 100 may fuse the plurality of pixel data LCG_Px_D, HCG_Px_D after reflecting the gain corresponding to the standard deviation in the ratio of the partial region and the gain corresponding to the brightness of the partial region. A method for fusing a plurality of pixel data LCG_Px_D, HCG_Px_D output from the target pixel (Third Row, Third Column, position 22) will be described later with reference to FIG. 9.

The image sensor 100 with the gain control configuration described in FIG. 6 can apply a dual conversion gain (DCG) to improve the quality of image data by increasing the dynamic range (DR), and can also apply a gain corresponding to the brightness of the partial region to improve the signal-to-noise ratio (SNR) in the dark region. In addition, even if the DCG ratio that may occur in a manufacturing process of the image sensor 100 is not constant or uniform, the gain corresponding to the standard deviation could be applied in a unit of partial regions, thereby reducing image quality degradation. For example, it is possible to reduce occurrence of a fake or deviated color in the image obtained by the image sensor 100.

Figure 7:
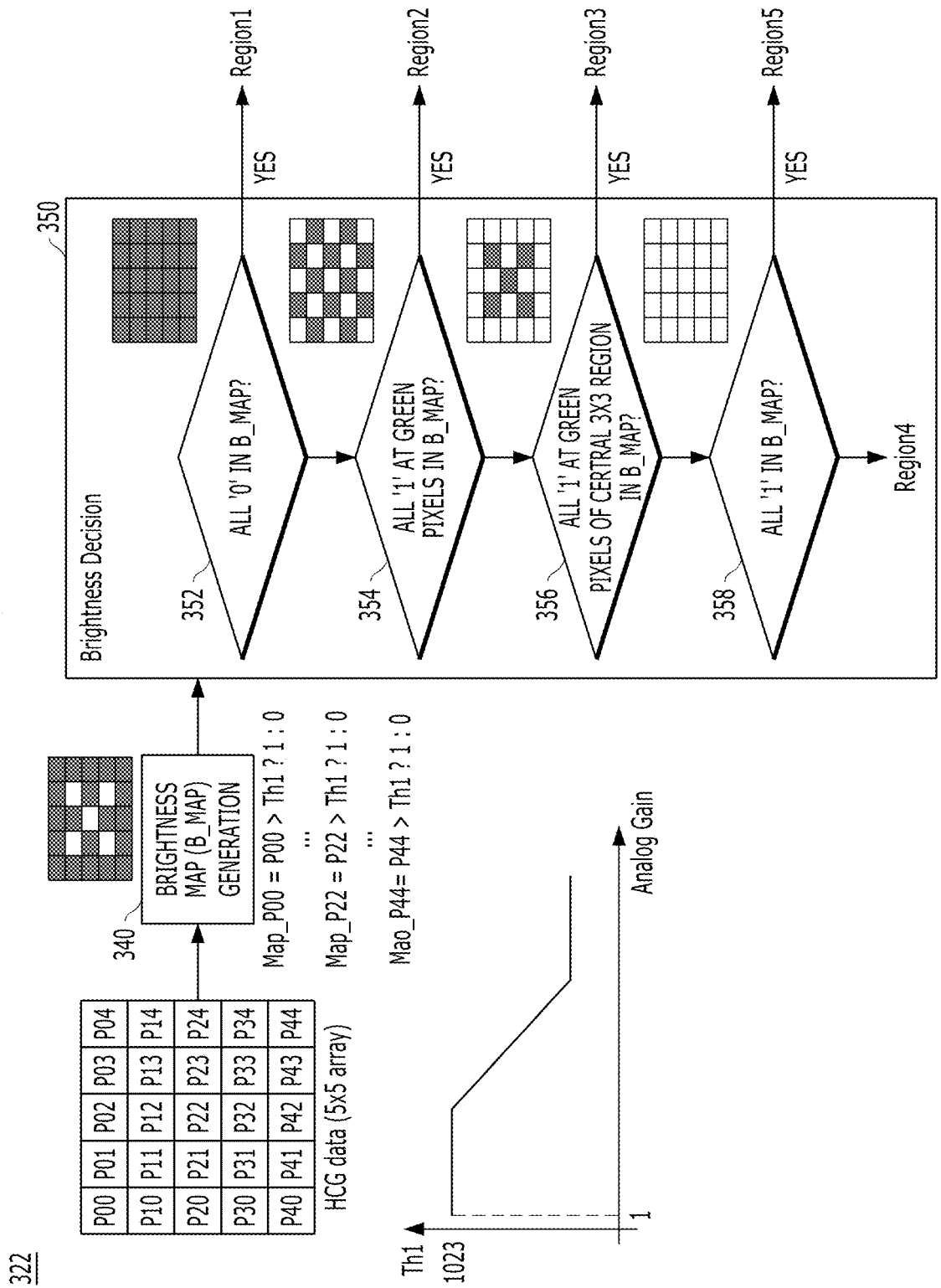
FIG. 7 is a diagram illustrating a method for obtaining brightness of a partial region according to an embodiment of the present disclosure.

FIG. 7 is a diagram illustrating a method for obtaining brightness of a partial region (322) described in FIG. 6 according to an embodiment of the present disclosure.

Referring to FIG. 7, the first kernel data (5×5 KERNEL LCG DATA) or the second kernel data (5×5 KERNEL HCG DATA, HCG data (5×5 array) described in FIG. 6 may be used to calculate the brightness of the partial region. For example, FIG. 7 describes a method for determining the brightness of the partial region using unscaled second kernel data (5×5 KERNEL HCG DATA, HCG data (5×5 array)).

The second kernel data (HCG data (5×5 array)) may include the second dynamic range pixel data HCG_Px_D which are output from the target pixel (Third Row, Third Column, position 22) and the multiple pixels located around the target pixel. A local brightness map B_map may be generated by comparing the second pixel data HCG_Px_D included in the second kernel data (HCG data (5×5 array)) with a reference value Th1 (operation 340).

According to an embodiment, the reference value Th1 may be changed corresponding to the obtained image data. When the reference value Th1 is changed, an analog gain determined corresponding to the brightness of the partial region may also be changed.

For example, each of the second dynamic range pixel data HCG_Px_D included in the second kernel data (HCG data (5×5 array)) may be compared with the reference value (Th1) through a comparator disposed in the image sensor 100. For example, a second dynamic range pixel datum (HCG_Px_D, P00) output from a first surrounding pixel (first row, first column, position 00) is compared with the reference value Th1. If the second dynamic range pixel datum (HCG_Px_D, P00) is greater than the reference value Th1, a value at the corresponding position in the local brightness map B_map becomes '1.' If the second dynamic range pixel datum (HCG_Px_D, P00) is less than the reference value Th1, the value at the corresponding position in the local brightness map B_map becomes '0.' A second dynamic range pixel datum (HCG_Px_D, P22) output from the target pixel (Third Row, Third Column, position 22) can be also compared with the reference value (Th1). The value at a position in the local brightness map B_map, corresponding to the target pixel, can be determined to be '1' if the second dynamic range pixel datum (HCG_Px_D, P22) is greater than the reference value Th1, whereas the value at the position in the local brightness map B_map might be '0' if the second dynamic range pixel datum (HCG_Px_D, P22) is less than the reference value Th1. Further, the second pixel data (HCG_Px_D, P44) output from another surrounding pixel (fifth row, fifth column, position 44) can be compared with the reference value Th1. The value at a position in the local brightness map B_map, corresponding to the another surrounding pixel, can be determined to be '1' if the second pixel data (HCG_Px_D, P44) is greater than the reference value Th1. Comparing the second kernel data (HCG data (5×5 array)) including the second dynamic range pixel data HCG_Px_D outputted from the pixel group including the target pixel and the multiple pixels surrounding the target pixel with the reference value Th1, the local brightness map B_map for the partial region could be determined.

When the brightness map B_map is determined, the image sensor 100 may determine characteristics of the brightness map B_map as one of preset categories, e.g., Region1, Region2, Region3, Region4, Region5. There are many cases for the brightness map B_map regarding the partial region corresponding to a 5×5 pixel array. According to an embodiment, the image sensor 100 may classify the brightness map B_map regarding the partial region into a preset number of categories based on a color filter and a separation distance between the target pixel and a surrounding pixel.

Referring to FIG. 7, in order to determine the brightness of the partial region (operation 350), the image sensor 100 may determine whether all values included in the brightness map B_map are '0' (operation 352). For example, if a value included in the brightness map (B_map) is '0,' brightness of a pixel is less than the reference value Th1, which means that that area is darker than the reference value. When it is determined that the target pixel and the multiple pixels disposed around the target pixel are dark, the image sensor 100 determines the brightness of the corresponding region as a first region brightness Region1 among the preset categories.

If the brightness of at least one pixel in the brightness map B_map is greater than the reference value Th1, the image sensor 100 may determine whether the brightness of the pixels on which a green color filter is disposed is greater than the reference value Th1 (e.g., '1') (operation 354). When the brightness of plural pixels on which the green color filter is disposed on the brightness map B_map is greater than the reference value Th1, the image sensor 100 determines the brightness of the partial region as a second region brightness Region2 among the preset categories.

If the brightness of at least one pixel on which the green color filter is placed in the brightness map B_map is less than the reference value Th1, the image sensor 100 may select a narrow domain, e.g., central 3×3 pixels adjacent to the target pixel, in the brightness map B_map, and then determine whether the brightness of plural pixels on which the green filter is disposed among selected 3×3 pixels is less than the reference value Th1 (operation 356). When the brightness of plural pixels on which the green color filter is disposed on selected 3×3 pixels of the brightness map B_map is greater than the reference value Th1, the image sensor 100 determines the brightness of the partial region as a third region brightness Region3 among the preset categories.

If the brightness of the partial region is not determined as the first region brightness to third region brightness Region1 to Region3 based on the brightness map B_map, the image sensor 100 may determine whether all values included in the brightness map B_map are "1" (operation 358). If all values included in the brightness map B_map are '1' (i.e., all values included in the brightness map are greater than the reference value Th1), the image sensor 100 may determine the brightness of the local region as a fifth region brightness Region5 among the preset categories. If not (i.e., the brightness of the partial region does not belong to the first region brightness to third region brightness Region1 to Region3 and the fifth region brightness Region5 among the preset categories), the image sensor 100 may determine the brightness of the partial region as a fourth region brightness Region4 among the preset categories.

Referring to FIG. 7, the image sensor 100 can establish preset categories (e.g., five categories Region1, Region2, Region3, Region4, Region5), and determine the brightness of the partial region as one of preset categories by referring to the separation distances between the target pixel and the multiple pixels surrounding the target pixel and the color filter disposed in the target pixel and the multiple pixels. Herein, the method for determining the brightness of the partial region described in FIG. 7 is an example and may be changed according to an embodiment.

Figure 8:
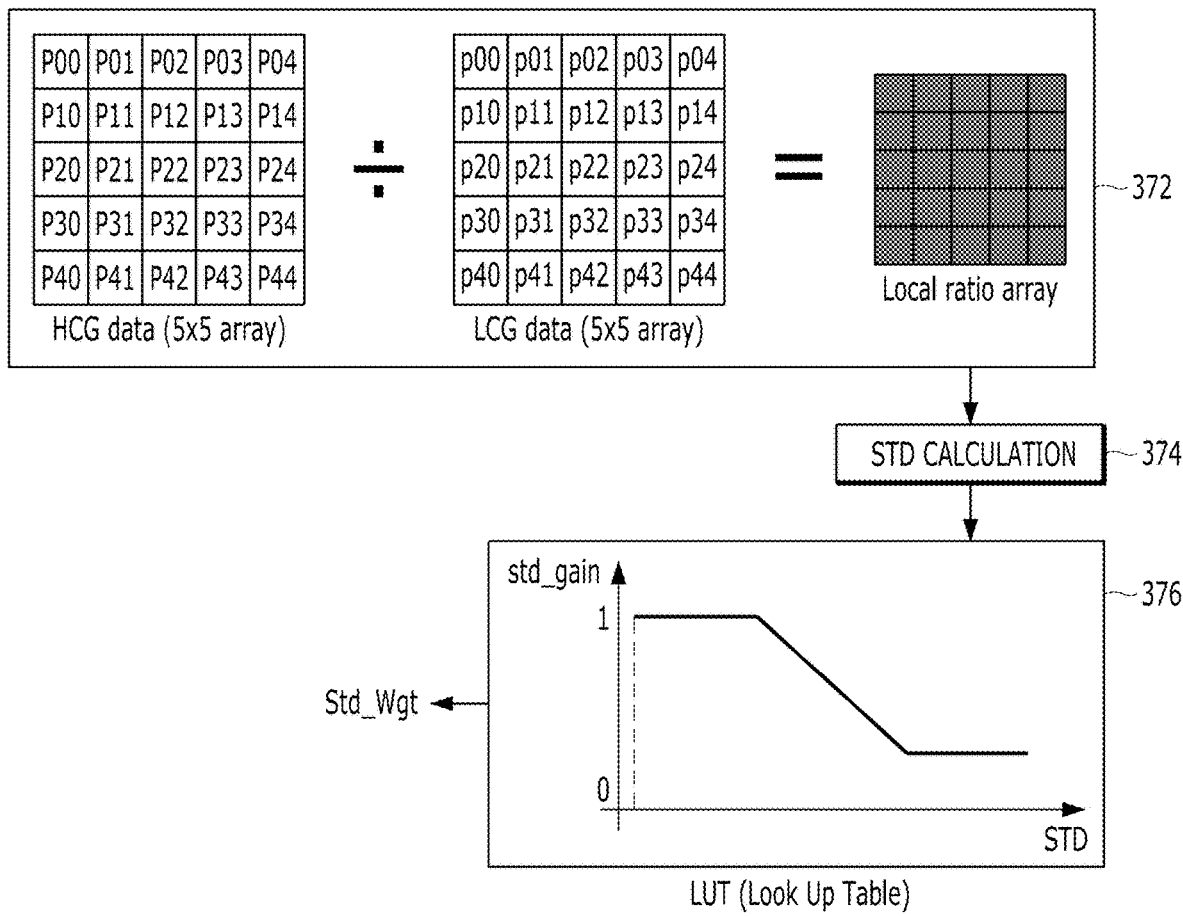
FIG. 8 is a diagram illustrating a method for determining a gain applied to a partial region according to an embodiment of the present disclosure.

FIG. 8 is a diagram illustrating a method for determining a gain applied to a partial region described in FIG. 6 according to an embodiment of the present disclosure. A gain applied to the partial region described in FIG. 8 may be to reduce or prevent distortion or noise of a signal that may occur when a DCG ratio is not constant or uniform due to various regions, e.g., the change of Process, Voltage, and Temperature (PVT) including a manufacturing process of the image sensor 100.

Referring to FIG. 8, a method for determining the gain applied to the partial region (324) may include determining a local ratio (372), calculating a standard deviation STD (374), and determining a gain std_gain corresponding to the standard deviation STD based on preset information (376).

To determine the gain to be applied to the partial region, the first kernel data (5×5 KERNEL LCG DATA) or the second kernel data (5×5 KERNEL HCG DATA) described in FIG. 6 may be used. For example, in FIG. 8, a partial region ratio may be determined using the first kernel data (5×5 KERNEL LCG DATA, LCG data (5×5 array)) and the second kernel data (5×5 KERNEL HCG DATA, HCG data (5×5 array)) (372). Referring to FIG. 6, the first kernel data (5×5 KERNEL LCG DATA, LCG data (5×5 array)) may be a scaled value.

After outputting multiple pixel data with different dynamic ranges from the pixel 112 in the pixel array 110, a dynamic range of the pixel 112 may be increased by adjusting the multiple pixel data to have substantially the same input range through scaling. Because the same scene is being photographed, the values of multiple pixel data output from pixels at the same location may be substantially the same after scaling. However, due to various reasons occurring in the manufacturing process of the image sensor 100, the values of the multiple pixel data may not be substantially the same even after scaling the multiple pixel data. The image sensor 100 can divide the second kernel data (5×5 KERNEL HCG DATA, HCG data (5×5 array)) into the first kernel data (5×5 KERNEL LCG DATA, LCG data (5×5 array)) to determine the partial region ratio (372).

After determining the partial region ratio (e.g., the ratio of the first kernel data (5×5 KERNEL LCG DATA, LCG data (5×5 array)) and the second kernel data (5×5 KERNEL HCG DATA, HCG data (5×5 array))), the image sensor 100 may calculate the standard deviation STD (374). The standard deviation STD may be used to attenuate noise that may be included in plural pixel data and be caused by an issue generated during a manufacturing process of the image sensor 100 or an issue generated during an operation of the image sensor 100.

The image sensor 100 may include information, e.g., a look up table (LUT) preset regarding the gain std_gain according to the standard deviation STD. After calculating the standard deviation STD, the image sensor 100 may determine the gain std_gain based on the preset information. Through this procedure, the image sensor 100 may determine a second gain Std_Wgt to be applied to a pixel datum output from the target pixel (Third Row, Third Column, position 22).

Figure 9:
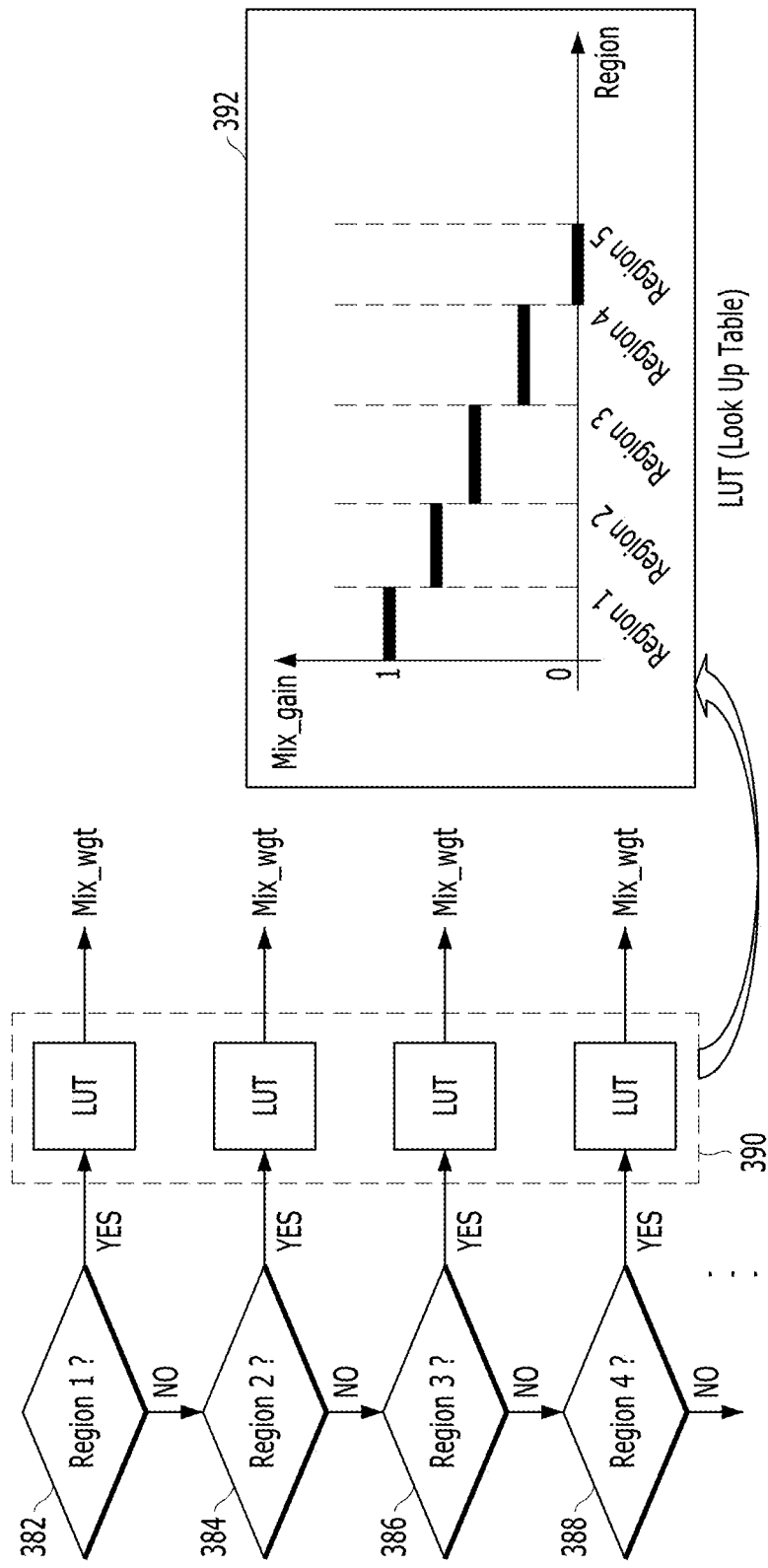
FIG. 9 is a diagram illustrating a method for obtaining a gain and applying the gain to image data according to an embodiment of the present disclosure.

FIG. 9 is a diagram illustrating a method for obtaining a gain and applying the gain to image data described in FIG. 6 according to an embodiment of the present disclosure. Specifically, FIG. 9 shows how to determine a first gain Mix_wgt based on the brightness of the partial region after determining the brightness of the partial region described in FIG. 7. In addition, FIG. 9 describes a method for fusing the plurality of pixel data, i.e., the first dynamic range pixel data LCG_Px_D and the second dynamic range pixel data HCG_Px_D, output from a target pixel (Third Row, Third Column, position 22).

Referring to FIG. 9, when the image sensor 100 determines the brightness of the partial region (e.g., a brightness corresponding a specific pixel group in the pixel array) as one of predetermined categories, a gain corresponding to the brightness of the partial region may be determined. The image sensor 100 may determine whether the brightness of the partial region belongs to the first region brightness Region1 (382). If the brightness of the partial region belongs to the first region brightness Region1, the image sensor 100 may determine a gain Mix_wgt by referring to preset information, e.g., Look Up Table (LUT). The preset information, e.g., Look Up Table (LUT), can include a preset gain corresponding to the brightness of the partial region. For instance, the LUT can store different gains corresponding to the number of categories that distinguish the brightness of the partial region.

If the brightness of the partial region does not belong to the first region brightness Region1, the image sensor 100 may determine whether the brightness of the partial region belongs to the second region brightness Region2 (384). If the brightness of the partial region belongs to the second region brightness Region2, the image sensor 100 may determine the gain Mix_wgt by referring to the preset information, e.g., Look Up Table (LUT).

If the brightness of the partial region does not belong to the second region brightness Region2, the image sensor 100 may determine whether the brightness of the partial region belongs to the third region brightness Region3 (386). If the brightness of the partial region belongs to the third region brightness Region3, the image sensor 100 may determine the gain Mix_wgt by referring to the preset information, e.g., Look Up Table (LUT).

If the brightness of the partial region does not belong to the third region brightness Region3, the image sensor 100 may determine whether the brightness of the partial region belongs to the fourth region brightness Region4 (388). If the brightness of the partial region belongs to the fourth region brightness Region4, the image sensor 100 may determine the gain Mix_wgt by referring to the preset information, e.g., Look Up Table (LUT).

If the brightness of the partial region does not belong to the fourth area brightness Region4, the brightness of the partial region may belong to the fifth region brightness Region5, the image sensor 100 may determine the gain Mix_wgt by referring to the preset information, e.g., Look Up Table, LUT). Through this procedure, the image sensor 100 may determine the first gain Mix_Wgt to be applied to a pixel datum output from the target pixel (Third Row, Third Column, position 22).

Referring to FIGS. 8 and 9, the image sensor 100 may determine the first gain Mix_Wgt and the second gain Std_Wgt to be applied to pixel data output from the target pixel (Third Row, Third Column, position 22). Thereafter, the image sensor 100 may fuse a plurality of pixel data, i.e., the first dynamic range pixel data LCG_Px_D and the second dynamic range pixel data HCG_Px_D, output from the target pixel (Third Row, Third Column, position 22). The plurality of pixel data output from the target pixel (Third Row, Third Column, position 22) may apply the first gain Mix_Wgt and the second gain Std_Wgt to the first pixel data (LCG_Px_D, P22) and the second pixel data (HCG_Px_D, P22). According to an embodiment, each of the first gain Mix_Wgt and the second gain Std_Wgt may have a value between 0 and 1.

Referring to FIGS. 6 to 9, the plurality of pixel data (P22 PX_D) output from a target pixel (Third Row, Third Column, position 22), e.g., a specific position in the pixel array 110, may be fused to generate a fused pixel datum (P22 PX_CD). The equation shown in FIG. 9 is an example for generating the fused pixel datum (P22 PX_CD). The equation may be changed or modified according to an embodiment.

Referring to the equation, the second pixel data (HCG_Px_D, P22) may be multiplied by the first gain Mix_Wgt (a first item of the equation, i.e., P22×Mix_Wgt). The scaled first pixel data (LCG_Px_D, p22') may be multiplied by a value (1−Mix_Wgt) obtained by subtracting the first gain Mix_Wgt from 1, and then multiplied by the second gain std_wgt (a second item of the equation, i.e., p22'×(1−Mix_wgt)×std_wgt). In addition, the second pixel data (HCG_Px_D, P22) can be multiplied by a value (1−Mix_Wgt) obtained by subtracting the first gain (Mix_Wgt) from 1, and then multiplied by a value (1−std_wgt) obtained by subtracting the second gain std_wgt from 1 (a third item of the equation, i.e., P22×(1−Mix_Wgt)×(1−std_wgt)). Thereafter, the image sensor 100 may add the first to third items to generate and output a fused pixel datum P22 PX_CD.

There are two cases: a first case where an image is obtained through an image sensor that scales a first pixel datum or a second pixel datum according to the dual conversion gain (DCG) and then merely fuses the scaled first and second pixel data; and a second case where an image is obtained through the image sensor that scales the first pixel datum or the second pixel datum according to the dual conversion gain (DCG), applies the gains corresponding to the brightness of the partial region and the standard deviation to the scaled first pixel datum or the scaled second pixel datum, and then fuses scaled and gain-applied pixel data to generate the fused pixel datum.

Comparing the first case and the second case, a fake or deviated color area may occur in the first case, but the fake or deviated color area may be reduced (or not found) in the second case. For example, the image in the first case may contain a solid red line or a red-colored area that is less correlated with the surrounding image. The solid red line or the red-colored area may occur due to noise or distortion. On the other hand, in the second case, it may be seen that the noise or distortion found in the first case does not occur.

As above described, the image sensor in accordance with an embodiment of the present invention may increase a dynamic range and improve a signal-to-noise ratio (SNR) of a dark region in an image output from the image sensor.

In addition, the image sensor according to an embodiment of the present invention can minimize image quality degradation such as a fake or deviated color even though distribution of the dual conversion gain (DCG) ratio that may occur, due to a manufacturing process of the image sensor, is poor.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods or operations of the computer, processor, controller, or other signal processing device, are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, control circuitry, devices, modules, units, multiplexers, generators, logic, interfaces, decoders, drivers, generators and other signal generating and signal processing features of the embodiments disclosed herein may be implemented, for example, in non-transitory logic that may include hardware, software, or both. When implemented at least partially in hardware, the controllers, processors, control circuitry, devices, modules, units, multiplexers, generators, logic, interfaces, decoders, drivers, generators and other signal generating and signal processing features may be, for example, any of a variety of integrated circuits including but not limited to an application-specific integrated circuit, a field-programmable gate array, a combination of logic gates, a system-on-chip, a microprocessor, or another type of processing or control circuit.

When implemented at least partially in software, the controllers, processors, control circuitry, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods or operations of the computer, processor, microprocessor, controller, or other signal processing device, are described in detail, the code or instructions for implementing the operations of the method embodiments may transform the computer, processor, controller, or other signal processing device into a special-purpose processor for performing the methods described herein.

While the present teachings have been illustrated and described with respect to the specific embodiments, it will be apparent to those skilled in the art in light of the present disclosure that various changes and modifications may be made without departing from the spirit and scope of the disclosure as defined in the following claims. Furthermore, the embodiments may be combined to form additional embodiments.

What is claimed is:

1. An image sensor, comprising:
   a pixel array including a plurality of pixels arranged in a matrix form, each pixel outputting a first pixel datum and a second pixel datum according to a dual conversion gain (DGC); and
   a signal converter configured to:
   generate first kernel data including first pixel data and second kernel data including second pixel data, wherein the first and second pixel data are output from a pixel group including a target pixel and multiple pixels surrounding the target pixel;
   determine brightness of a partial region based on the second pixel data included in the second kernel data; and
   perform fusion of the first kernel data and the second kernel data based on the brightness of the partial region,
   wherein the signal converter comprises:
   a gain controller configured to determine a gain according to the brightness of the partial region, apply the gain to a first pixel datum and a second pixel datum output from the target pixel, and perform the fusion of the first kernel data and the second kernel data; and
   an analog-to-digital converter configured to convert an analog datum output from the gain controller into a digital datum.

2. The image sensor according to claim 1, wherein the first kernel data and the second kernel data have a same size of the pixel group having a 3×3, 5×5, or 7×7 matrix form.

3. The image sensor according to claim 1, wherein a conversion gain for determining a first pixel datum output from the target pixel is less than that for determining a second pixel datum output from the target pixel.

4. The image sensor according to claim 1, wherein a conversion gain for determining a second pixel datum output from the target pixel is less than that for determining a first pixel datum output from the target pixel.

5. The image sensor according to claim 1, wherein the signal converter is configured to:
   compare a second pixel datum of the target pixel included in the second kernel data with predetermined criteria regarding brightness of the multiple pixels to obtain comparison results; and
   classify the comparison results according to at least one of color filters of the multiple pixels and distances between the multiple pixels and the target pixel to determine the brightness of the partial region.

6. The image sensor according to claim 5, wherein the signal converter is configured to determine a first gain based on the brightness of the partial region.

7. An image sensor, comprising:
   a pixel array including a plurality of pixels arranged in a matrix form, each pixel outputting a first pixel datum and a second pixel datum according to a dual conversion gain (DGC); and
   a signal converter configured to:
   generate first kernel data including first pixel data and second kernel data including second pixel data, wherein the first and second pixel data are output from a pixel group including a target pixel and multiple pixels surrounding the target pixel;
   determine brightness of a partial region based on the second pixel data included in the second kernel data; and
   perform fusion of the first kernel data and the second kernel data based on the brightness of the partial region,
   wherein the signal converter is configured to determine a second gain based on standard deviation determined based on the first kernel data and the second kernel data.

8. The image sensor according to claim 7, wherein the signal converter is configured to:
   divide the second kernel data by the first kernel data to determine a partial region ratio;
   calculate the standard deviation of the partial region ratio; and
   determine the second gain based on the standard deviation.

9. The image sensor according to claim 1, wherein the signal converter is configured to:
   apply different gains to the first kernel data and the second kernel data; and
   perform the fusion of the first kernel data and the second kernel data to which the different gains are applied.

10. The image sensor according to claim 1, wherein the pixel comprises:
    a transfer transistor that transfers charges generated by a photo-converting element to a floating node;
    a reset transistor that resets the floating node in response to a reset signal;
    a capacitor, selectively connected to the floating node, to change capacitance of the floating node;
    an amplification transistor that outputs a voltage corresponding to a potential change of the floating node; and
    a selection transistor that outputs the voltage transmitted from the amplification transistor as one of the first pixel datum and the second pixel datum.

11. A method for operating an image sensor, comprising:
    outputting a first pixel datum and a second pixel datum according to a dual conversion gain (DCG) from each pixel in a pixel group;
    generating first kernel data including first pixel data and second kernel data including second pixel data, wherein the first and second pixel data are output from the pixel group including a target pixel and multiple pixels surrounding the target pixel;

determining a first gain based on brightness of a partial region determined based on the first kernel data and the second kernel data;

determining a second gain based on a deviation regarding the partial region determined based on the first kernel data and the second kernel data; and performing fusion of the first pixel datum and the second pixel datum to which the first gain and the second gain are applied.

12. The method according to claim 11, further comprising:

converting a fusion pixel datum generated by the fusion of the first pixel datum and the second pixel datum into a digital pixel datum.

13. The method according to claim 11, wherein the first kernel data and the second kernel data have a same size of the pixel group having a 3×3, 5×5, or 7×7 matrix form.

14. The method according to claim 11, wherein the determining the first gain comprises:

comparing a second pixel datum of the target pixel included in the second kernel data with predetermined criteria regarding brightness of the multiple pixels to obtain comparison results;

classifying the comparison results according to at least one of color filters of the multiple pixels and distances between the multiple pixels and the target pixel to determine the brightness of the partial region; and determining a first gain based on the brightness of the partial region.

15. The method according to claim 11, wherein the determining the second gain comprises:

dividing the second kernel data by the first kernel data to determine a partial region ratio;

calculating a standard deviation of the partial region ratio; and determining the second gain based on the standard deviation.

16. The method according to claim 11, wherein a conversion gain for determining the first pixel datum output from the target pixel is less than that for determining the second pixel datum output from the target pixel.

17. The method according to claim 11, wherein a conversion gain for determining the second pixel datum output from the target pixel is less than that for determining the first pixel datum output from the target pixel.

18. A camera device which is capable of outputting a first pixel datum and a second pixel datum according to a dual conversion gain (DCG) from each pixel in a pixel group, in response to an operation mode change or an ISO sensitivity setting, wherein the camera device is configured to: generate first kernel data including first pixel data and second kernel data including second pixel data, which are output from the pixel group including a target pixel and multiple pixels surrounding the target pixel; determine a first gain based on brightness of a partial region determined based on the first kernel data and the second kernel data; determine a second gain based on a deviation of the partial region determined based on the first kernel data and the second kernel data; and perform fusion of the first pixel datum and the second pixel datum to which the first gain and the second gain are applied.

19. The camera device according to claim 18, wherein the camera device is configured to convert a fusion pixel datum generated by the fusion of the first pixel datum and the second pixel datum into a digital pixel datum.

* * * * *